United States Patent Office 3,152,123
Patented Oct. 6, 1964

3,152,123
PROCESS FOR THE PREPARATION OF BENZO-DIHYDROTHIADIAZINE DERIVATIVES
Rezső König and Zoltán Földi, Budapest, Hungary, assignors to Chinoin Gyogyszer-es Vegyeszeti Termekek Gyara RT, Budapest, Hungary
No Drawing. Filed Feb. 3, 1960, Ser. No. 6,384
Claims priority, application Hungary, Feb. 19, 1959, KO 1,367
6 Claims. (Cl. 260—243)

This invention relates to a new method for the preparation of 6-chloro-7-sulphonamido-benzo-1,2,4-dihydro-thiadiazine-1,1-dioxides.

Benzo-dihydro-thiadiazine derivatives are valuable compounds which may be used as pharmaceuticals or as intermediates for the preparation of pharmaceuticals.

The general formula of these thiadiazine derivatives is the following:

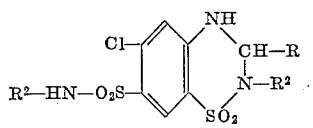

where R stands for hydrogen or an alkyl group, $R^2$ stands for hydrogen or an alkyl group. Some of these compounds may be used as diuretics, administered perorally, some also show hypotensive action.

We have found that valuable benzo-dihydro-thiadiazine derivatives may be prepared by subjecting compounds of the general formula

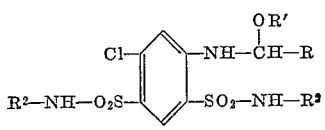

where $R^1$ stands for an alkyl group, R and $R^2$ stands for hydrogen or a lower alkyl group, to the action of compounds delivering protons.

In a preferred form of the process 1-(α-alkoxy-alkyl-amino)-benzene-3-chloro-4,6-disulphonylamide is subjected to the action of water, preferably at a temperature of 80–100° C. For example 3-chloro-1-(methoxymethyl-amino)-benzene-4,6-disulphonylamide is heated with water.

In another form of the process 3-chloro-aniline-4,6-disulphonylchloride is subjected to the action of mono-chlorodimethylether, the resulting N-methoxymethyl-derivative, e.g. 3-chloro-N-(methoxymethyl)-aniline-4,6-disulphonyl-chloride, is reacted with ammonia, e.g. it can be reacted without isolation with an excess of ammonia in alcohol or with an excess of liquid ammonia. The medium is then removed and the remainder is subjected to the action of water, preferably to acidified water. As proton delivering compounds, instead of water acids, e.g. gaseous hydrochloric acid may also be used. When reacting, e.g. 3-chloro-4,6-disulphonamido aniline with monochloro dimethyl ether, in absence of acid binding agents the gaseous hydrochloric acid, set free during the reaction, is the proton-delivering compound.

The products of the present invention have a low toxicity and high diuretic potency in the human and animal organism and can be used in conventional manner as diuretic agents in the human and animal organism without undesirable side effects, e.g. the toxicity of 6-chloro-7-sulphonamido-benzo-dihydro-1,2,4-thiadiazine-1,1-dioxide, is in the range of 1 g. per kg. body-weight. The dose to be administered to human patients preferably amounts to 0.005 g. to 0.01 g. per kg. weight of the patient and such dose can be administered preferably per os, e.g. in tablets, 2–3 times daily.

Examples (1) 1 g. of 1-methoxymethyl-amino-3-chloro-benzene-4,6-disulphonylamide is boiled with 5 ml. of water for 1½ hours under reflux. The slight alkalinity is then eliminated by addition of a few drops of glacial acetic acid and boiling is continued for another ½ an hour. The reaction mixture which contains during all this treatment crystals, is then cooled; the product which crystallizes in hexagonal platelets is filtered by suction, washed with 2 x 1 ml. portions of water and then dried. 0.9 g. of 6-chloro-7-sulphonamido-benzo-dihydro-1,2,4-thiadi-azine-1,1-dioxide are obtained (snow-white crystals melting at 256° C.).

(2) 1.85 g. of 3-chloro-N-methoxymethyl-aniline-4,6-disulphonylchloride (M.P. 165° C.) are dissolved while cooling with ice in 12.5 ml. of 3.35 N anhydrous alcoholic ammonia. The reaction mixture is then boiled under reflux and taken in vacuo to dryness. 12 ml. of water are added to the amorphous residue (a mixture of 3-chloro-N-(methoxymethyl)-aniline-4,6-disulphonyl-amide and ammonium chloride). An oily precipitate is formed. The whole mixture is kept on a hot water bath under reflux, whereupon a transient solution results. Soon crystallization sets in. Kept for an hour in a hot water bath, it is boiled for another 15 minutes. After cooling, the crystals are filtered by suction and washed with water until free of halogen. On drying 1.2 g. of 6-chloro-7-sulphonamido-benzo-dihydro-1,2,4-thiadiazine-1,1-dioxide are obtained. (Snow-white crystals, melting in this state of purity at 257° C.) On standing an additional 0.1 g. of the product crystallizes from the mother liquor.

(3) 5 ml. of dry acetone and thereafter 0.9 ml. of monochlorodimethylether are added to 2.9 g. of 3-chloro-aniline-4,6-disulphonylamide (M.P. 252° C.). Stirred for some minutes the mixture dissolves and the temperature rises to 30–35° C.; 4 ml. of anhydrous ether are then added. Crystallizing starts on scrubbing. After standing, 15 ml. of ether are added gradually. On standing for another 1 hour, the crystals are isolated, washed with 5 x 2 ml. portions of dry ether and dried. 2.65 g. of 6-chloro-7-sulphonamido-benzo-dihydro-1,2,4-thiadiazine-1,1-dioxide melting at 255° C. are obtained. Analysis shows 12.0% Cl in good conformity with the theoretical value.

Further amounts of the product may be obtained from the mother liquors.

The melting point of the product rises on recrystallization from 50% aqueous alcohol to 257–259° C.

(4) 5 ml. of dry acetone and thereafter 1.2 ml. of (α-chloro-ethyl)-methyl-ether are added to 2.9 g. of 3-chloro-aniline-4,6-disulphonylamide. The reaction mixture is shaken while gently cooling; a solution is formed, from which crystals separate in about 20 minutes and the reaction mixture changes gradually into a thick pulp. After standing 1.5 hours at room temperature, the crystals are filtered by suction, abundantly washed with ether, then dried in a desiccator. 2.7 g. of 3-methyl-6-chloro-7-sulphonamido-benzo-dihydro-1,2,4-thiadiazine-1,1-dioxide are obtained, melting at 248° C. with decomposition.

What we claim is:

1. A process for the preparation of benzo-dihydro-thiadiazine derivatives which comprises contacting a compound of the formula

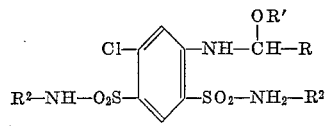

where R and $R^2$ stand for a member of the group consisting of hydrogen and a lower alkyl and $R^1$ means a lower alkyl with a compound selected from the group consisting of water, hydrochloric acid, and acetic acid, at a temperature and for a time sufficient to form a thiadiazine compound of the formula:

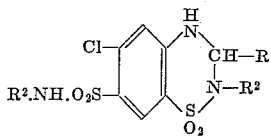

2. A process for the preparation of benzo-dihydro-thiadiazine derivatives which comprises contacting a compound of the formula

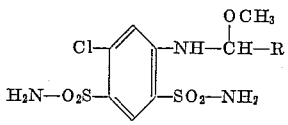

where R stands for a member of the group consisting of hydrogen and methyl with a compound selected from the group consisting of water, hydrochloric acid, and acetic acid, at a temperature and for a time sufficient to form a thiadiazine compound of the formula:

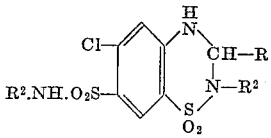

3. A process for the preparation of benzo-dihydro-thiadiazine derivatives, which comprises contacting 1-(methoxymethyl-amino) - 3-chloro - benzene - 4,6-disulphonylamide with water at about 80–100° C.

4. The process which comprises dissolving 1-methoxymethyl - amino-3-chloro-benzene-4,6-disulphonylchloride in an excess of alcoholic ammonia, then boiling under reflux, then evaporating to dryness and heating the remaining 1 - (methoxy - methyl-amino)-3-chloro-benzene-4,6-disulphonylamide contaminated by ammoniumchloride with water at 80–100° C. and isolating 6-chloro-7-sulphonamido-benzo-dihydro-1,2,4-thiadiazine-1,1,dioxide.

5. The process which comprises adding acetone and monochlorodimethyl - ether to 3 - chloro-aniline-4,6-disulphonyl-amide for reaction leading to a solution of 1-(methoxymethyl -amino) - 3 - chloro - benzene-4,6-disulphonylamide and hydrogenchloride, allowing the reaction mixture to stand and precipitating by addition of ether, 6 - chloro - 7 - sulphonylamido - benzo - dihydro - 1,2,4-thiadiazine-1,1-dioxide.

6. The process which comprises adding to 3-chloro-aniline - 4,6 - disulphonylamide acetone and ($\alpha$ - chloroethyl)-methyl-ether for reaction leading to a solution of 1 - ($\alpha$ - methoxy - ethylamino) - 3 - chloro - benzene-4,6-disulphonylamide and hydrogenchloride, allowing to stand and isolating the resulting crystals off 3-methyl-6-chloro-7-sulphonamido - benzo - dihydro - 1,2,4-thiadiazine-1,1-dioxide after standing.

References Cited in the file of this patent

Freeman et al.: Journ. Org. Chem., vol. 16 (1951), page 821.

Raffa: Il Farmaco Ed. Sc., vol. 9, p. 664 (1954).